US006608162B1

(12) United States Patent
Chiu et al.

(10) Patent No.: US 6,608,162 B1
(45) Date of Patent: Aug. 19, 2003

(54) SPRAY-DRIED PHENOL FORMALDEHYDE RESINS

(75) Inventors: Shui-Tung Chiu, Springfield, OR (US); Curtis Michael Shelast, Mundare (CA); Eric Kenneth Lam, Burnaby (CA)

(73) Assignee: Borden Chemical, Inc., Columbus, OH (US)

( * ) Notice: Subject to any disclaimer, the term of this patent is extended or adjusted under 35 U.S.C. 154(b) by 0 days.

(21) Appl. No.: 10/099,410

(22) Filed: Mar. 15, 2002

(51) Int. Cl.$^7$ .................... C08G 14/06; C08G 8/16; C08G 8/22

(52) U.S. Cl. .............. 528/129; 528/137; 528/145; 528/162; 528/492; 528/495; 528/503; 524/594; 524/597

(58) Field of Search ................ 528/129, 137, 528/145, 162, 492, 495, 563; 524/594, 597

(56) References Cited

U.S. PATENT DOCUMENTS

| | | | |
|---|---|---|---|
| 2,524,079 A | | 10/1950 | Rhodes |
| 2,952,040 A | | 9/1960 | Phillips |
| 3,903,041 A | | 9/1975 | Bornstein |
| 4,089,839 A | | 5/1978 | Jancis |
| 4,098,770 A | * | 7/1978 | Berchem et al. |
| 4,251,408 A | | 2/1981 | Hesse et al. |
| 4,424,300 A | | 1/1984 | Udvardy et al. |
| 4,426,484 A | | 1/1984 | Saeki |
| 4,433,120 A | | 2/1984 | Chiu |
| 4,950,433 A | | 8/1990 | Chiu |
| 5,019,618 A | * | 5/1991 | Chiu |
| 5,047,275 A | * | 9/1991 | Chiu |
| 5,085,930 A | | 2/1992 | Widmann |
| 5,374,678 A | | 12/1994 | Collins et al. |
| 5,637,658 A | | 6/1997 | Teodorczyk |

OTHER PUBLICATIONS

Houwink, R., and G. Salomon, Adhesion and Adhesives, 1965, pp. 230–240, vol. 1, Elsevier Publishing Company, Amsterdam.

Dressler, Hans, Resorcinol—Its Uses and Derivatives, 1994, pp. 85–124, Plenum Press, New York.

* cited by examiner

*Primary Examiner*—Duc Truong
(74) *Attorney, Agent, or Firm*—Gardner Carton & Douglas LLC

(57) ABSTRACT

The invention relates to formulations and methods of manufacturing spray-dried phenol-formaldehyde resin that contain highly reactive phenolic compounds that include resorcinol, alkyl resorcinols, meta-amino phenol or/and phloroglucinol. The powder resin contains 0.02 to 0.09 moles of the free (unreacted) highly reactive phenolic compound per 100 parts of the solids of the dried phenol-formaldehyde resin. The powder resin composition has fast curing property and desirable shelf life for manufacturing wood composite products.

27 Claims, No Drawings

SPRAY-DRIED PHENOL FORMALDEHYDE RESINS

FIELD OF THE INVENTION

The invention relates to formulations and methods of manufacturing spray-dried phenol-formaldehyde resins.

BACKGROUND

Oriented strand board (OSB) may be manufactured with liquid and powdered phenol-formaldehyde resins. To achieve productivity goals, face and core-layers of the OSB may require resins having different properties. The face-layer resin normally should offer some resistance to premature cure, resistance to sticking to the platen and should have a light color after cure. The core-layer resin should normally be fast curing.

Spray-dried phenol-formaldehyde resins are known. U.S. Pat. No. 4,098,770 described that spray-dried powder resins which were suitable for bonding wood waferboard and which were made by spray-drying resole resin compositions containing non-phenolic polyhydroxy compounds. The resole resins were phenol-formaldehyde and phenol-cresol-formaldehyde resins. The non-phenolic polyhydroxy compounds included glycols, polyhydroxy ethers and polyhydroxy compounds.

U.S. Pat. No. 4,424,300 described a powder resin that was made by spray-drying a liquid resin mixture that contained a novolac resin and a resole resin. The phenol-formaldehyde resins included creosol, xylenol and/or catechol modified resins.

U.S. Pat. No. 4,950,433 described a pre-cure resistant powder resin for wood waferboard/oriented strand board manufacture, which was made by spray-drying a liquid resin composition containing a phenol-formaldehyde resin and a water soluble oxo-boron compound such as sodium borate.

U.S. Pat. No. 5,085,930 described a thermosetting powder resin that was made by spray-drying a composition containing a thermosetting resin and an inert inorganic particle.

Several methods have been suggested for improving curing speed of novolac and resole phenol-formaldehyde resins. U.S. Pat. No. 2,524,079 described a phenol-resorcinol-formaldehyde novolac resin made by heating a sodium hydroxide catalyzed novolac phenol-formaldehyde resin and sodium hydroxide catalyzed novolac resorcinol-formaldehyde resin.

U.S. Pat. No. 2,952,040 described a fast cure felt or woven fibrous compound product, which was made by impregnating the felt or woven fibrous compound with a resole phenol-formaldehyde resin and a sodium hydroxide catalyzed novolac resorcinol-formaldehyde resin.

U.S. Pat. No. 4,251,408 described a resin binder composition desirable for manufacturing abrasives, wherein the resin was a mixture of resole resin and phenol-resorcinol-formaldehyde resin.

U.S. Pat. No. 4,426,484 described a fast curing shell molding compound-resin that contained a solid resole resin and a novolac resorcinol resin. The solid resole resin was made by dehydration of liquid resole resin under vacuum.

Resorcinol has also been suggested to improve the curing speed of novolac resins. U.S. Pat. No. 4,089,839 suggests that mixing 1–10 parts of resorcinol to a novolac resin and a curing agent, can reduce cycle time to produce a shell mold. The curing agent is a formaldehyde donor such as hexamethylenetetramine.

Novolac type resorcinol-formaldehyde resins and phenol-resorcinol-formaldehyde resins are incorporated with a formaldehyde solution, paraformaldehyde or phenol-formaldehyde resin as cold set wood product adhesives. The adhesive systems were described in Houwink, R. and G. Saloman, *Adhesion and Adhesives*, Vol. 1.$2^{nd}$ Ed., Elsevier Publishing Co. pp. 230–240 (1975) and Dressler, H., *Resorcinol—Its Uses and Derivatives*, Plenum Press. pp. 85–95 (1994).

U.S. Pat. No. 3,903,041 described a fast cure particleboard adhesive made by mixing a resole phenol-formaldehyde resin with 2–4% of a phenol-resorcinol-formaldehyde resin.

U.S. Pat. No. 5,637,658 described a fast cure resin composition which contains a resorcinol or aminophenol modified resole resin and a formaldehyde donor as the curing agent. The resorcinol or aminophenol modified resole resin was made by further condensing a resole resin with resorcinol or aminophenol. The curing agents can be a formaldehyde based resin, paraforrmaldehyde or hexamethylene tetramine.

U.S. Pat. No. 5,374,678 described an adhesive composition which may be capable of bonding to a hard wood. The adhesive composition was a mixture of phenol-formaldehyde resole, 2.5–5% phenolic novolac resin and 0.25 to 1% of m-amino phenol, p-amino phenol, resorcinol, phloroglucinol or resorcinol-phenol-formaldehyde resin.

What is needed is a stable, spray-dried, fast curing resole resin system. What is further needed is a fast curing spray-dried resole resin composition that contains a highly reactive phenolic compound as a curing accelerator. What is also needed is a fast-curing, spray-dried resole resin that flows adequately under heat and pressure. What is still further needed is a fast-curing, spray-dried, resole resin composition that has a desired storage life at ambient temperature.

SUMMARY OF THE INVENTION

An embodiment of the present invention provides a fast curing spray-dried phenol-formaldehyde composition that contains 0.02–0.09 moles of highly reactive phenolic compounds per 100 parts of the solids of the phenolic resin as a curing accelerator. The curing accelerators may include resorcinol, alkyl resorcinols, m-amino phenol and phloroglucinol. The curing accelerator in the powder resin functions as cross-linking agent that reacts with the methylol groups of the phenol-formaldehyde resin under the heat and pressure experienced during manufacturing wood composite products.

The fast curing powder resin composition of the present invention may be made in one embodiment by: (1) preparing a resole liquid phenol-formaldehyde resin that contains the desired methylol groups and molecular weight; (2) eliminating the residual free formaldehyde with a scavenging agent; (3) mixing the prepared resole liquid phenol-formaldehyde resin with a highly reactive phenolic compound; and (4) spray-drying the mixture to prepare a powder resin composition without realizing a chemical reaction between the highly reactive phenolic compound and the phenol-formaldehyde resin. The spray-drying process stabilizes the highly reactive phenolic compound in the phenol-formaldehyde resin composition.

The present invention provides a fast-curing, spray-dried, resole resin that is a powder resin composition that has a desired shelf life for wood composite manufacture. The present invention provides a fast curing spray-dried resole resin composition that contains a highly reactive phenolic compound as a curing accelerator. The present invention also provides a fast-curing, spray-dried resole resin that flows adequately under heat and pressure. The present invention also provides a powder resin composition that can improve wood composite manufacturing productivity at relatively low cost. The present invention still further provides a powder resin composition that tolerates higher variation of wood moisture contents. Therefore, higher quality of the wood composite can be manufactured.

DETAILED DESCRIPTION OF THE PREFERRED EMBODIMENTS

There is provided, according to the principals of the present invention, a method for making a fast cure powder resin composition, and a fast cure powder resin composition made by this method. The method includes the steps of:

1. Preparing a liquid phenol-formaldehyde resin;
2. Reducing the residual formaldehyde-from the liquid resin with a formaldehyde scavenging agent and cooling the resin temperature below 30° C.;
3. Mixing a curing accelerator with the cooled liquid resin; and
4. Spray-drying the mixture to form a powder resin that contains less than 5% free water content.

Preparation of Phenol-formaldehyde Resin

A preferred resole resin is made by a two-stage reaction method that can produce a desired molecular weight distribution. The resin making technique involves two formaldehyde additions and two distinct reaction temperatures. The first stage involves a higher reaction temperature that is favorable to the condensation reaction and produce a higher molecular weight resin. The second stage is a lower reaction temperature that is favorable to the methylolation reaction between formaldehyde and phenol.

For the first stage reaction, the molar ratios of phenol: formaldehyde: sodium hydroxide are preferable 1:(1.2–1.6):(0.15–0.25) and more broadly, 1:(0.9–2.0):(0.1–0.3). temperature is about 90° C. to reflux. The resin is reacted at the temperature until the number average molecular weight is preferably 1000 to 1300 and broadly 900 to 1700. The molecular weight was determined by the gel permeation chromatograph (GPC) method.

At the end of the first stage reaction, the temperature is then reduced to 65–70° C. for second stage reaction. For the second stage reaction, the second portion of the formaldehyde is added to the resin. Therefore, the final molar ratios of phenol: formaldehyde:sodium hydroxide are preferably 1:(1.8–2.2):(0.15–0.25) and, more broadly, 1:(1.5–2.5):(0.1–0.3) stage reaction preferably is allowed to react at 60–70° C. until the free formaldehyde is constant. Usually the reaction time is about 1.5–2.0 hours after making the second formaldehyde addition. The free formaldehyde content can be determined by the well-known hydroxylamine-hydrochloride method. A formaldehyde scavenging agent is then added to reduce the residual formaldehyde in the resin to non-detectable levels.

The liquid resin described in U.S. Pat. No. 4,433,120, incorporated herein by reference, may also be used. Alternatively, the phenol for manufacturing the liquid resin process may be partly substituted with xylenols, cresols, catechol and the naturally occurring alkyl phenols such as cresylic acid. The formaldehyde may be replaced partly or completely with other aldehydes such as para-formaldehyde and acetaldehyde. Sodium hydroxide is preferably a catalyst for the resin manufacture. Alternatively, other alkali metal hydroxides, alkaline earth hydroxides, and metal carbonates such as sodium or potassium carbonate may be used in combination with sodium hydroxide.

Reduction of Residual Formaldehyde in the Liquid Resin

In order to achieve the fast curing property of the spray-dried resin, the curing accelerator should not be consumed by reacting with residual formaldehyde in the resin. Therefore, it is essential to reduce the amount of residual formaldehyde with a scavenger before mixing with the curing accelerator. The quantity of the scavenger can be determined by a stoichiometric calculation.

A preferred formaldehyde scavenger is ammonia. The ammonia source can be ammonia gas, aqueous ammonia and/or ammonia salts of organic and inorganic compounds. Aqueous ammonia hydroxide (25–50%) is preferred ammonia source. Alternatively, the formaldehyde scavengers can be selected from ketones, amines and amides.

Moreover, in order to produce a fine-particle size of the spray-dried resin, the resin is preferably formulated with a surfactant at 0.2–0.8% based on the liquid resin weight to reduce the surface tension of the resin.

After completion of the formaldehyde scavenging step, the temperature of the liquid resin is preferably cooled to below 25° C.

Preparation of a Liquid Resin Composition Containing Curing Accelerator

The fast cure spray-dried resin of the present invention preferably contains about 0.02 mole to about 0.09 mole of the free curing accelerator per 100 parts of the solids phenol-formaldehyde resin. The curing accelerator is homogeneously mixed with liquid resin before spray-drying.

The curing accelerators of the present invention are those phenolic compounds that have a higher reactivity towards formaldehyde and methylol groups of a phenol-formaldehyde resin than does phenol itself. Exemplary curing accelerators of the present invention include dihydroxy phenols, trihydroxy phenols, meta-amino phenols and meta-alkyl phenols.

The dihydroxy phenols are selected from the meta-dihydroxy compounds that include resorcinol and alkyl resorsinols. The alkyl resorsinols that are methyl and higher alkyl group substituted resorcinol are natural products extracted from shale oil or oil sand. Trihydroxy phenol is phloroglucinol. The meta-alkyl phenols include meta cresol and 3,5 xylenol.

The most preferred curing accelerator is resorcinol in view of its high reactivity, relative lower cost and availability.

After spray-drying, the retention of the free curing accelerator in the resin depends on residual formaldehyde content, the temperature of the liquid resin and the time between mixing and spray-drying. It is preferred that the liquid resin is cooled to below 25° C. before mixing with the curing accelerator and that spray-drying of the mixture occurs as soon thereafter as possible. Therefore, it is the most desirable that an in-line mixture of the liquid resin and a solution of the curing accelerator be made just prior to beginning the spray-drying process. Using this in-line mixing process, the time between mixing and spray-drying can be less than 5 minutes. In a more preferred embodiment, the in-line mixing process can be performed in the range of from about 0.25 minutes to about 3 minutes.

Alternatively, a batch process may also be used for preparation of the mixture of liquid resin and curing accelerator. Due to longer mixing time prior to spray-drying, lower temperatures are required to reduce the decay rate of the curing accelerator. For example, at 20° C., the resin mixture can be spray-dried within 8 hours. The lower the mixing temperature, the longer the shelf life of the mixture.

Powder Resin Composition Containing Curing Accelerator

The powder resin is produced by spray-drying a liquid resin mixture that include a phenol-formaldehyde resin and a curing accelerator. The resin mixture atomized to fine droplets in a hot-air stream and the powder resin composition is separated from the stream of hot air. The powder resin is immediately cooled to below 20° C. for bagging and storage.

The curing accelerators are heat sensitive compounds. In order to obtain high retention rate of the free-curing accelerator in the powder resin, the spray dryer is operated at mild conditions. Typically, inlet temperatures are from about 140 to about 160° C. and outlet temperatures are from about 70 to about 90° C.

For wood strand board application the bonding efficiency of a spray-dried resin is significantly correlated with powder particle size distribution. Normally, the smaller the particle size the more efficient is the powder resin at the bonding. The preferred particle size distribution is on that has about 80–90% of the powder resin having a p article size of less than 75 microns and 60–70% having a particle size of less than 45 microns. It is known in the art of spray-drying that the desired particle size distribution may be obtained by manipulation of spray-drying operation variables including infeed resin solids content and surface tension, speed of the spinning atomizer and the liquid resin feed rate.

A drying agent, preferably calcium silicate, may be added at 0.3–1.0% based on the total weight of the dried resin.

The spray-drying process usually increases the resin molecular weight and decreases the content of the free curing accelerator, because some of the curing accelerator may be consumed by reaction with the methylol group of the phenolic resin. The free curing accelerator that is retained after the spray-drying process should be from about 0.02 to about 0.09 mole per 100 parts of the powder resin. The content of the free curing accelerator can be determined preferably by a high-pressure liquid chromatograph (HPLC) equipped with a $C_{18}$ column.

Moreover, in order to obtain the desired thermal flow property and high bonding efficiency, the number average molecular weight ($M_n$) of the powder resin should be 1100–1500 preferably and 1000–1900 broadly.

Determination of Free Formaldehyde

A sample of liquid resin (6.0 g or alternatively, a sample of powdered resin, 3.0 g) is dissolved in 7:3 v/v N-methylpyrrolidone-water (100 mL), cooled to 3–5° C., 1.0 N HCl added until pH 4.00, and hydroxylamine hydrochloride solution added (2 mL; prepared by dissolving hydroxylarnine hydrochloride (70 g) in water (1 L) and adjusting to pH 4.0 with 1.0 N NaOH). After 5 minutes in the ice bath, the solution is autotitrated with 0.1 N NaOH to a pH 4.00 endpoint and volume of NaOH solution recorded (mL).

Calculate the percent free formaldehyde as follows:

(mL NaOH)×(conc. NaOH)×3.002/sample wt.=% Free Formaldehyde

Determination of Free Resorcinol

A sample of powder resin (0.5 g) is dissolved in acetate buffer and diluted up to 100 mL (buffer prepared by dissolving sodium acetate trihydrate (13.6 g) and acetic acid (5.8 mL) in 1 L of water). A 10 mL portion of the resin solution is treated with 30% sulfuric acid (1–2 drops) and pH confirmed <4. After centrifugation, approx. 3 mL is decanted, filtered through a syringe filter, and a sample (50 µL) analyzed by RP-HPLC (eluant 80% acetate buffer—20% acetonitrile).

Calculate the percent free resorcinol as follows:

Resorcinol conc in solution (µg/mL)×100 mL/sample wt. (g)× $10^6$(µg/mL)=5% Free Resorcinol The resorcinol concentration is determined from a standard calibration curve which plots peak height vs. concentration, in which observed resorcinol baseline-corrected peak height is used.

EXAMPLE 1

The examples provided demonstrates preparation of liquid phenol-formaldehyde resin precursor and the preparation of a resorcinol modified spray-dried powder resin. The resorcinol modified powder resin showed an improved fast cure property for wood strand board manufacture.

Preparation of Liquid Phenol-Formaldehyde Resin Precursor

A liquid resin was prepared from the following ingredients:

| Ingredient | Parts by Weight | Molar Ratio |
|---|---|---|
| Phenol (100% concentration) | 31.88 | 1 |
| 1st Water | 11.31 | |
| 1st Sodium Hydroxide (50% concentration) | 4.39 | 0.16 |
| 1st Formaldehyde (50% concentration) | 30.51 | 1.5 |
| 2nd Water | 2.30 | |
| 2nd Sodium Hydroxide (50% concentration) | 0.99 | 0.037 |
| 2nd Formaldehyde (50% concentration) | 13.76 | 0.68 |
| 3rd Water | 2.87 | |
| Aqua Ammonia (28–30% concentration) | 1.99 | |
| Total | 100.00 | |

The phenol, first water and first sodium hydroxide were charged to a reactor. The temperature was kept at 50–55° C. Started program addition of the first formaldehyde over 30 minutes and allowed temperature to exotherm to 65° C. and maintained at 65° C. for another 20 minutes. Added the second water, then heated the resin to 90° C. in 30 minutes and maintained at 90° C. until a Gardner-Holdt viscosity (at 25° C.) of B to C. Cooled to 85° C. and continued to react at 85° C. until 10 minutes after a viscosity (@25° C.) of H to I. Cooled rapidly to 75° C., added the second sodium hydroxide, and adjusted the temperature to 70° C. Then program addition of the second formaldehyde over 20 minutes and maintained the temperature at 70° C. Added the third water and continued at 70° C. until 10 minutes after a viscosity (@25° C.) of T to U. Then rapidly cooled to below 50° C. Charged aqua ammonia under the surface of the liquid resin batch. After adding the ammonia, mixed for 5 minutes and analyzed the free formaldehyde content in the liquid resin. The free formaldehyde content was 0.05%. In order to eliminate the residual formaldehyde, 0.061 parts of 30% aqua ammonia per 100 parts of the liquid resin was added.

The free formaldehyde was analyzed by the well-known hydroxylamine hydrochloride method. Briefly, a resin sample was first dissolved in a solvent that consisted of a 70:30 ratio of (N-methyl pyrrolidone:water). The sample is then cooled to about 0–5° C., acidified and titrated under an ice water bath. The low temperature is necessary to reduce the interference from the adducts of formaldehyde and ammonia.

After the ammonia addition, continued to cool the liquid resin to below 25° C. and analyzed. The results were as follows:

| | |
|---|---|
| Viscosity (25° C.): | U (Gardner-Holdt) |
| | 625 cps (Brookfield) |
| Refractive Index (25° C.): | 1.4756 |
| Non-volatile content: | 48.4% |
| Sodium hydroxide content: | 2.7% |
| Number average molecular weight ($M_n$): | 1223 |
| Weight average molecular weight ($M_w$): | 1388 |

The molecular weight distribution was analyzed with gel permeation chromatography (GPC). The GPC was set up with a UV detector set at a wavelength of 285 nm. The column was PL Gel Mixed B of Polymer Laboratory, UK. The solvent was dimethyl sulfoxide (DMSO).

Preparation of Liquid Phenol-formaldehyde Resin and Resorcinol Mixture

Samples of control and resorcinol modified liquid phenol-formaldehyde (PF) resins were prepared as shown in Table 1. The resorcinol was first dissolved in cold water (<25° C.) and then mixed with the liquid resin and oleic acid. The oleic acid is added to reduce the surface tension of the resin mix.

TABLE 1

| | PF Resin/Resorcinol Mixes | | | | | |
|---|---|---|---|---|---|---|
| | Control | Resin 1 | Resin 2 | Resin 3 | Resin 4 | Resin 5 |
| PF Resin | 100 | 100 | 100 | 100 | 100 | 100 |
| Resorcinol | 0 | 1.0 | 2.0 | 3.2 | 4.3 | 5.4 |
| Oleic acid | 0.15 | 0.16 | 0.16 | 0.17 | 0.17 | 0.18 |
| Water | 38.4 | 37.4 | 36.3 | 39.4 | 42.4 | 46.0 |
| Total | 138.55 | 138.56 | 138.46 | 142.77 | 146.87 | 151.58 |
| Solids content (%) | 35.0 | 35.8 | 36.6 | 36.3 | 36.0 | 35.6 |
| Resorcinol content (%) | 0 | 0.7 | 1.4 | 2.2 | 2.9 | 3.6 |
| R.I. (25° C.) | 1.4299 | | 1.4313 | 1.4313 | | |
| Viscosity (Gardner-Holdt) | B | | BB-C | BB-C | | |

The liquid resin mixtures were spray-dried to powder resin using a Mini Spray Dryer, Model Buchi 190 of Brinkmann Instruments Co. The spray dryer was operated at 185° C. inlet temperature and 80–90° C. outlet temperature. During the spray-drying process, the chamber was brushed manually to simulate an air broom used in an actual production spray-dryer.

The powder resin was collected in a receiver where the temperature was about 50–55° C. The powder resin was screened through a 100 mesh sieve and then mixed with 0.3% calcium silicate drying agent. The powder resins were stored in a freezer before testing by making wood strand-boards.

Moreover, the powder, resins were analyzed for non-volatiles, thermal flow, free resorcinol content and molecular weight distribution. The results are shown in Table 2.

TABLE 2

Powder Resin Properties

|  | Control | Resin 1 | Resin 2 | Resin 3 | Resin 4 | Resin 5 |
|---|---|---|---|---|---|---|
| Molecular weight ($M_n$) | 1239 | | | | | |
| Molecular weight ($M_w$) | 1408 | | | | | |
| Non-volatile content (%) | 89.8 | 89.9 | 91.3 | 90.2 | 92.4 | 91.6 |
| Fusion diameter (mm) | 35 | 35 | 28 | 28 | 27 | 32 |
| Sodium Hydroxide content (%) | 5.0 | 5.03 | 5.13 | 5.09 | 5.24 | 5.20 |
| Theoretical Resorcinol content (%) | 0 | 1.75 | 3.49 | 5.47 | 7.44 | 9.26 |
| Free Resorcinol content (%) | 0 | | 1.53 | 3.70 | | |
| Resorcinol Retention (%) | | | 43.8 | 67.6 | | |

Non-volatile content was determined by drying three samples of 0.5 grams resin in an oven at 125° C. for 105 minutes. The non-volatile content is the percent of the dried resin based on the original sample weight. Thermal flow was tested by using the Fusion Diameter method as described by the Structural Board Association.

Free resorcinol in the powder resin was-analyzed by a gas chromatograph (GC) method. The method involved using meta-cresol as an internal standard, methyl tertiary-butyl ether as the solvent for extraction of the phenolic compounds from an acidified resin sample, and then silylation of the extracted phenolic compound. The GC was a Hewlett-Packard 5880A with a flame ionization detector. The column was a 6 feet×⅛ inch steel column packing with 3% OV-17 on 80–100 mesh Supelcoport (Supelco column).

As shown in Table 2, two powder samples were analyzed for free resorcinol content. The free resorcinol retentions were 43.8% and 67.6% for Resins 2 and 3 respectively.

EXAMPLE 2

This example evaluates the powder resin compositions prepared in Example 1 by making wood strandboards with different press times to compare curing speeds.

Laboratory size (10×10×0.44 inch) strandboards were made at the conditions similar to production of an oriented strandboard (OSB) mill. Commercial OSB aspen wood furnish which contained 3.5–4.0% moisture content was first sprayed with 1.5% molten slack wax and then blended with 2.4% powder resin based on dry wood weight.

The wax and resin treated wood furnish was formed and pre-pressed into a mat. The pre-pressed mat was then hot pressed to 0.44 inch thick strandboard, using a 410° F. platen temperature press, 0.44 inch metal spacers, and 500 psi press pressure. The press times were 2.00, 2.25, 2.50, 2.75, and 3.00 minutes for the control resin and 1.75, 2.00, 2.25, 2.50, and 2.75 minutes for the resorcinol modified powder resins—Resins 1, 2, 3, 4, and 5.

Three internal bond (IB) samples and two 2-hour boil modulus of rupture (MOR) samples were tested for each panel according to CSA Standard CAN3-0437.1-M85. The results are shown in Table 3.

As shown in Table 3, the internal bond results show that the resorcinol modified powder resins (Resins 1–5) improve the cure speed for strandboard manufacture. The optimum theoretical resorcinol content that showed the fastest curing speed was 5.47% (Resin 3) in which it contained 3.7% free resorcinol as analyzed and recorded in Table 2. Further increase of the theoretical resorcinol contents from 5.47% (Resin 3) to 7.44% (Resin 4) and 9.26% (Resin 5) did not further improve on the curing speed of the powder resin (Table 3).

TABLE 3

Lab Strandboard Properties

| Press Time (minutes) | Bond Density (pounds/ft$^3$) | Internal Bond (psi) | 2-Hour Boil MOR (psi) |
|---|---|---|---|
| Control (0% Resorcinol); Mat moisture = 3.9% | | | |
| 2.00 | | Delamination | |
| 2.25 | 39.0 | 0 | 2151 |
| 2.50 | 39.8 | 54.2 | 1912 |
| 2.75 | 43.6 | 64.3 | 2176 |
| 3.00 | 42.1 | 62.8 | 2495 |
| Resin 1 (1.75% Resorcinol); Mat moisture = 3.3% | | | |
| 1.75 | | Delamination | |
| 2.00 | 41.4 | 12.4 | 1206 |
| 2.25 | 40.5 | 58.1 | 1930 |
| 2.50 | 40.9 | 68.4 | 2190 |
| 2.75 | 43.0 | 58.5 | 2142 |
| Resin 2 (3.49% Resorcinol); Mat moisture = 3.6% | | | |
| 1.75 | | Delamination | |
| 2.00 | 41.3 | 34.1 | 1603 |
| 2.25 | 40.8 | 60.0 | 1578 |
| 2.50 | 41.8 | 64.9 | 1672 |
| 2.75 | 42.0 | 69.2 | 1754 |
| Resin 3 (5.47% Resorcinol); Mat moisture = 3.9% | | | |
| 1.75 | | Delamination | |
| 2.00 | 42.0 | 52.8 | 1584 |
| 2.25 | 40.5 | 60.0 | 2194 |
| 2.50 | 41.5 | 66.3 | 2146 |
| 2.75 | 42.6 | 73.1 | 2244 |
| Resin 4 (7.44% Resorcinol); Mat moisture = 3.9% | | | |
| 1.75 | | Delamination | |
| 2.00 | 39.4 | 49.8 | 1678 |
| 2.25 | 38.9 | 53.2 | 1953 |
| 2.50 | 42.5 | 53.7 | 2344 |
| 2.75 | 39.0 | 66.0 | 2353 |
| Resin 5 (9.26% Resorcinol); Mat moisture = 3.8% | | | |
| 1.75 | | Delamination | |
| 2.00 | 39.9 | 53.7 | 1718 |
| 2.25 | 38.6 | 57.1 | 1742 |
| 2.50 | 41.5 | 66.6 | 2003 |
| 2.75 | 42.4 | 74.6 | 1954 |

EXAMPLE 3

This example demonstrates a batch process for manufacturing resorcinol modified phenol-formaldehyde resin, effect of spray-drying time on free resorcinol content of the powder resin, and an OSB mill trial of the spray-dried resin.

A batch (56,100 kg) of phenol-formaldehyde resin was made according to the formulation and procedure outlined in Example 1. After adjusting the free formaldehyde content of the resin to zero with the ammonia scavenger, the liquid resin had the following properties:

Non-volatile content: 48.1%

Refractive index (25° C.): 1.4760

Sodium hydroxide content: 2.8%

Viscosity (Gardner-Holdt): TU

Viscosity (Brookfield at 25° C.): 550 cps

The phenol-formaldehyde resin was mixed with resorcinol by the following procedure:

|  | Weight % | Weight (kg) |
| --- | --- | --- |
| Phenol-formaldehyde resin | 70.13 | 56100 |
| Oleic acid | 0.12 | 94 |
| 1st water | 27.10 | 21681 |
| Resorcinol | 1.42 | 1136 |
| 2nd water | 1.23 | 984 |
| Total | 100.00 | 79995 |

When the phenol-formaldehyde resin was cooled to 48° C., oleic acid was added and mixed for 10 minutes. The first water was then mixed and continually cooled to 21° C. A cooled (18° C.) resorcinol solution was added to the phenol-formaldehyde resin. The resorcinol solution was prepared by mixing resorcinol and the second water. The properties of the resorcinol modified phenol-formaldehyde resin are as follows:

Non-volatile content: 35.04%

Refractive index (25° C.): 1.4323

Viscosity (Brookfield at 25° C.): 72 cps

Theoretical resorcinol content: 1.42%

The resin mix was spray-dried into powder resin by using a production spray dryer that was operated under the following conditions:

Inlet temperature: 146–150° C.

Outlet temperature: 80–81° C.

Liquid resin temperature: 21° C.

Liquid resin spray dry rate: 48 kg/minute

The spray-dried powder resin was rapidly cooled to 18–20° C. and then mixed with 0.3% calcium silicate drying agent before bagging.

The spray-dried powder had the following properties:

Particle size distribution:

>75 microns: 12–14%

<75 and >35 microns: 39–42%

<35 microns 42–44%

Bulk density: 0.46–0.50 g/cm$^3$

Free water content: 1–3%

Non-volatile content: 90–92%

Theoretical resorcinol content: 3.69%

The free resorcinol content and thermal flow (fusion diameter) of the powder resin were tested periodically. The free resorcinol content was tested by gas chromatography method. The results are shown in Table 4.

TABLE 4

Powder Resin Properties

| Spray-drying time (hours) | Fusion Diameter (mm) | Free Resorcinol (%) | Free Resorcinol Retention (%) |
| --- | --- | --- | --- |
| 2.0 | 34 | 2.6 | 71 |
| 3.5 | 34 | 2.5 | 68 |
| 6.0 | 33 | 2.6 | 71 |
| 9.5 | 32 | 2.0 | 54 |
| 12.0 | 34 | 2.0 | 54 |
| 17.0 | 34 | 1.7 | 46 |
| 21.0 | 33 | 1.7 | 46 |
| 26.0 | 34 | 1.5 | 41 |
| 28.5 | 34 | 1.5 | 41 |

The results showed that the free resorcinol content in the powder resin decreased with the aging of the liquid resorcinol modified phenol-formaldehyde resin. During 28 hours of spray-drying, the free resorcinol content of the powder resin gradually decreased from 2.6% to 1.5%.

In order to test the cure speed of the resorcinol modified powder resin for OSB production, 19 bags (24,700 kg) of the powder resin containing more than 1.7% free resorcinol content was trailed as core resin at an OSB mill. The control core resin was a spray-dried resin that contained no resorcinol. The face resin was the spray-dried powder resin, Cascophen W91B (available from Borden Chemical, Inc., Edmonton, Alberta). The face/core-layer wood ratio was 60/40.

The OSB production trial lasted for 5 days, manufacturing 23/32 and 19/32 inch thick OSB. The press temperature was 410° F. The press cycle time is the time from press daylight to daylight. The results of the press cycle times on board quality are shown in Table 5. The "good" board quality in Table 5 means that the OSB panel met or passed Canadian Standards Association (CSA) standards for OSB.

TABLE 5

OSB Mill Production, Press Time Reduction

| Core Resin | Press Cycle Time (seconds) | Board Quality | Reduction in Cycle Time (%) |
| --- | --- | --- | --- |
| Board thickness: 23/32 inch | | | |
| Board density: 35–36 lbs/ft$^3$ | | | |
| Mat moisture content: Face - 6.0%, Core - 3.2% | | | |
| Control | 285 | Good | 0 |
| Example 3 | 255 | Good | 11 |
| Example 3 | 245 | Good | 14 |
| Example 3 | 240 | Fair | 16 |
| Board thickness: 19/32 inch | | | |
| Board density: 38 lbs/ft$^3$ | | | |
| Mat moisture content: Face - 6.8%, Core - 2.7% | | | |
| Control | 265 | Good | 0 |
| Example 3 | 225 | Good | 15 |
| Example 3 | 197 | Good | 26 |
| Example 3 | 187 | Good | 29 |

The mill trial confirmed that the resorcinol modified spray-dried powder resin had a fast curing property for OSB production. As shown in Table 5, the press cycle times can be reduced up to 14–29% depending on OSB thickness. Thus the modified powder composition can substantially improve OSB productivity.

The fast curing property of the resorcinol modified powder resin composition depends on the free resorcinol content in the powder resin. The free resorcinol content tends to decrease over time depending on storage temperatures. Therefore, the shelf-life of the powder resin at room temperature (23° C.) was also tested. A 2.0% free resorcinol content spray-dried resin was aged at room temperature and the free resorcinol content was periodically analyzed by GC. The results are shown in Table 6.

TABLE 6

Free Resorcinol Decay Rate

| Days at 23° C. | 0 | 7 | 14 | 21 | 35 | 49 | 53 |
|---|---|---|---|---|---|---|---|
| Free Resorcinol Content (%) | 2.0 | 1.9 | 1.9 | 1.7 | 1.5 | 1.3 | 1.2 |
| Free Resorcinol Retention (%) | 100 | 95 | 95 | 85 | 75 | 65 | 60 |

In order to obtain a significant fast cure property, the minimum free resorcinol content needs to be above 1.5%. Therefore, a powder resin that has 2% free resorcinol content has about 35 days shelf life at 23° C.

EXAMPLE 4

This example illustrates the manufacture of a resorcinol modified powder resin and the effect of temperatures on the shelf life of the powder resin.

A 9000 kg batch of phenol-formaldehyde liquid resin precursor was made according to the formulation and procedure of Example 1. The free formaldehyde content of the resulting resin was 0.05%. An additional 9 kg of 30% aqua ammonia was added to further reduce the free formaldehyde to zero. The properties of the resin were as follows:

Non-volatile: 48.41%
Refractive index (at 25° C.): 1.4782
Viscosity (Gardner-Holdt at 25° C.): RS
Viscosity (Brookfield at 25° C.): 485 cps The liquid resin was mixed with resorcinol-by the following method:

| | Weight % |
|---|---|
| Phenol-formaldehyde resin | 68.00 |
| Oleic acid | 0.12 |
| $1^{st}$ water | 27.40 |
| Resorcinol | 2.24 |
| $2^{nd}$ water | 2.24 |
| Total | 100.00 |

When the ammonia treated phenol-formaldehyde resin cooled to about 45–50° C., oleic acid was added and mixed for 10 minutes. The first water was then added and the mixture cooled to 18° C. Next, the 50% resorcinol solution (resorcinol+second water) was prepared and its temperature was cooled to 18° C.

The cooled resin and 50% resorcinol solution was mixed. The mixed liquid composition had the following properties:

Non-volatile content: 35.25%
Refractive index (25° C.): 1.4290
Viscosity (Gardner-Holdt at 25° C.): AB
Viscosity (Brookfield at 25° C.): 58 cps
Theoretical resorcinol content: 2.24%

The liquid resin composition was spray-dried to powder resin using a production spray dryer as described in Example 3 within 7 hours after the resorcinol was mixed with the phenolic resin. Three bags (1300 kg/bag) of powder resin were produced. The results of the powder resin were as follows:

| Sample (bag) | Fusion Diameter (mm) | Free Resorcinol (%) | Free Resorcinol Retention (%) |
|---|---|---|---|
| 1 | 36 | 4.6 | 79.5 |
| 2 | 41 | 4.6 | 79.5 |
| 3 | 35 | 4.5 | 77.6 |

For the shelf life test, Samples 1 and 3 were aged at room temperature (23° C.) and Sample 2 was aged at 4° C. The free resorcinol content was periodically analyzed. The results from the average of Sample 1 and 2 and Sample 3 are shown in Table 7.

TABLE 7

Free Resorcinol Decay Rate

| Days at 23° C. | 0 | 6 | 15 | 20 | 28 | 41 |
|---|---|---|---|---|---|---|
| Free Resorcinol Content (%) | 4.6 | 4.1 | 3.8 | 3.8 | 3.7 | 2.1 |
| Free Resorcinol Retention (%) | 100 | 89 | 83 | 83 | 80 | 46 |

| Days at 4° C. | 0 | 8 | 19 | 27 |
|---|---|---|---|---|
| Free Resorcinol Content (%) | 4.6 | 4.6 | 4.5 | 4.5 |
| Free Resorcinol Retention (%) | 100 | 100 | 98 | 98 |

The results showed the stability of the resorcinol modified powder composition was significantly affected by temperature. At 4° C., the powder composition was very stable. However, at room temperature (23° C.), the powder resin still had over 30 days of shelf life for OSB production.

In contrast, the free resorcinol in the liquid phenol-formaldehyde resin showed a very high decay rate. The liquid resin mix that contained 2.24% resorcinol was aged at 23° C. and the free resorcinol content was analyzed after aging for 24, 48, and 72 hours. The results are shown in Table 8.

TABLE 8

Free Resorcinol Decay Rate

| Hours at 23° C. | 0 | 24 | 48 | 72 |
|---|---|---|---|---|
| Free Resorcinol Content (%) | 2.24 | 1.15 | 0.78 | 0.6 |
| Free Resorcinol Retention (%) | 100 | 51 | 35 | 27 |

The results showed that the free resorcinol decay rate is very high in the liquid resin mix. However, after spray-drying, the free resorcinol in the powder is much more stable.

The free resorcinol contents were analyzed using a high pressure liquid chromatography (HPLC) method. The HPLC was operated under the following conditions:

Column: $\mu$-Bondapak $C_{18}$ of Waters Associates
Mobile phase: 30:70 ratio of (acetonitrile:water/acetate buffer)
Detector: Series 440 UV detector set at 254 nm wavelength

EXAMPLE 5

The example was to evaluate free formaldehyde scavengers sodium sulfite, ammonia, and a combination of ammonia and sulfite on:

1) spray-drying free resorcinol retention 2) free resorcinol decay rate of the spray-dried powder 3) powder resin curing speed for strandboard bonding.

A liquid phenol-formaldehyde resin was prepared as shown in Example 1 except no ammonia was added to scavenge the residual free formaldehyde. The resin was identified as Resin 5L and had the following properties:

Non-volatile content: 49.6%

Refractive index (25° C.): 1.4809

Viscosity (Gardner-Holdt at 25° C.): UV

Sodium hydroxide content: 2.75%

Phenol-formaldehyde content: 46.85%

Free formaldehyde content: 1.09%

The liquid phenol-formaldehyde resin (Resin 5L) was first treated with formaldehyde scavengers, then mixed with resorcinol, and spray-dried into powder resin.

Scavenger: Sodium Sulfite

A sodium sulfite solution was prepared by mixing 4.6 parts of sodium sulfite ($Na_2SO_3$) and 2.0 parts of sodium metabisulfite ($Na_2S_2O_5$) and 16.5 parts of water. The sulfite solution was mixed with 100 parts of Resin 5L at room temperature. After standing overnight, the free formaldehyde was analyzed. The sodium sulfite treated resin, namely Resin 5L (sulfite) had the following properties:

Non-volatile content: 45.65%

Refractive index (25° C.): 1.4638

Viscosity (Gardner-Holdt at 25° C.): R

Free formaldehyde content: 0.035%

The liquid resin composition, Resin 5L (sulfite), was further mixed with resorcinol as follows:

|  | Weight % |
|---|---|
| Resin 5L (sulfite) | 76.67 |
| Oleic acid | 0.11 |
| Resorcinol | 1.26 |
| Water | 21.96 |
| Total | 100.00 |

The Resin 5L (sulfite) was first mixed with the oleic acid and then mixed the resorcinol solution that was prepared by dissolving resorcinol in the water at room temperature. The liquid resin mix had the following properties:

Non-volatile content: 36.26%

Refractive index (25° C.): 1.4321

Viscosity (Gardner-Holdt at 25° C.): C

The liquid resin mix was spray-dried to powder resin with a laboratory spray dryer within 2 hours after mixing with resorcinol. The spray-dried powder resin was further mixed with 0.3% calcium silicate drying agent. This powder resin was identified as Resin 5 ($Na_2SO_3$).

Scavenger: Ammonia

The ammonia treatment of Resin 5L was made by mixing 97.8 parts Resin 5L with 2.2 parts aqua ammonia (30%) at room temperature. After overnight, the free formaldehyde content was analyzed. The ammonia treated resin was identified as Resin 5L ($NH_3$). The resin had the following properties:

Non-volatile content: 48.5%

Refractive index (25° C.): 1.4777

Viscosity (Gardner-Holdt at 25° C.): UV

Free formaldehyde content: 0.01%

A resorcinol modified Resin 5L ($NH_3$) mix was made as follows:

|  | Weight % |
|---|---|
| Resin 5L ($NH_3$) | 70.13 |
| Oleic acid | 0.12 |
| Resorcinol | 1.42 |
| Water | 28.33 |
| Total | 100.00 |

Again, the Resin 5L ($NH_3$) was mixed with the oleic acid and then mixed with resorcinol solution that was prepared by dissolving the resorcinol in the water at room temperature. The liquid resin mix had the following properties:

Non-volatile content: 35.43%

Refractive index (25° C.): 1.4321

Viscosity (Gardner-Holdt at 25° C.): BBC

The resin composition was spray-dried with a laboratory spray dryer within 2 hours after mixing with resorcinol. The powder resin was mixed with 0.3% calcium silicate drying agent. The powder resin was identified as Resin 5 ($NH_3$).

Scavenger: Ammonia and Sodium Sulfite

The experiment was to evaluate reducing agents, such as sulfites, for treatment of ammonia scavenged liquid phenolic resin, Resin 5L ($NH_3$) on spray-drying free resorcinol retention, resorcinol decay rate of aging powder resin, and curing speed for strandboard bonding.

A liquid resin mix containing a reducing agent, sodium sulfite, was made as follows:

|  | Weight % |
|---|---|
| Resin 5L ($NH_3$) | 70.13 |
| Oleic acid | 0.12 |
| Sodium sulfite | 0.50 |
| Resorcinol | 1.42 |
| Water | 27.83 |
| Total | 100.00 |

The sodium sulfite and resorcinol were first dissolved in the water and then mixed with Resin 5L ($NH_3$). The liquid mix had the following properties:

Non-volatile content: 35.93%

Refractive index (25° C.): 1.4345

Viscosity (Gardner-Holdt at 25° C.): BCC

The liquid resin mix was spray-dried into powder and mixed with 0.3% calcium silicate drying agent. The powder resin was identified as Resin 5 ($NH_3/Na_2SO_3$).

Control Powder Resin

The control spray-dried resin was made from spray-drying a 35% solids content of water diluted Resin 5L ($NH_3$). The resin contained no resorcinol.

Analysis of the Powder Resins

The powder resins were tested for non-volatile content, fusion diameter, and free resorcinol. The free resorcinol content was analyzed using the GC method. The results are shown in Table 9.

TABLE 9

Powder Resin Properties

| Sample | Non-volatile Content (%) | Fusion Diameter (mm) | Free Resorcinol (%) | Free Resorcinol Retention (%) |
|---|---|---|---|---|
| Resin 5 ($Na_2SO_3$) | 90.4 | 28 | 0.15 | 4 |
| Resin 5 ($NH_3$) | 90.5 | 33 | 2.39 | 65 |
| Resin 5 ($NH_3/Na_2SO_3$) | 89.9 | 32 | 2.59 | 71 |
| Control | 91.0 | 33 | 0 | N/A |

The results showed that ammonia is a desired free formaldehyde scavenger for spray-drying the resorcinol modified resin mix. Sodium sulfite was a poor scavenging agent for retention of free resorcinol. However, when the ammonia scavenged liquid resin was further treated with sulfite, the spray-dried resin, Resin 5 ($NH_3/Na_2SO_3$), had a lighter color and higher free resorcinol retention. Therefore, reducing agents such as sulfite can improve the free resorcinol retention.

Shelf Life of the Powder Resin

The curing speed of the powder resins for strandboard bonding depends on the free resorcinol content that gradually decreases by aging at room temperature. Therefore, the powder resins were tested by aging at room temperature (23° C.). The results of the free resorcinol decay rates are shown in Table 10.

TABLE 10

Free Resorcinol Decay Rate

| Days at 23° C. | 0 | 7 | 15 | 21 | 29 |
|---|---|---|---|---|---|
| Resin 5 ($Na_2SO_3$) | | | | | |
| Free Resorcinol Content (%) | 0.15 | 0.03 | | | |
| Free Resorcinol Retention (%) | 100 | 20 | | | |
| Resin 5 ($NH_3$) | | | | | |
| Free Resorcinol Content (%) | 2.39 | 2.11 | 1.93 | 1.75 | 1.68 |
| Free Resorcinol Retention (%) | 100 | 89 | 81 | 73 | 70 |
| Resin 5 ($NH_3/Na_2SO_3$) | | | | | |
| Free Resorcinol Content (%) | 2.59 | 2.40 | 2.24 | 2.04 | 1.96 |
| Free Resorcinol Retention (%) | 100 | 93 | 87 | 79 | 76 |

A minimum free resorcinol content in the powder resin that significantly improves the curing speed is about 1.5%. Therefore, both of the ammonia treated powder resins, Resin 5 ($NH_3$) and Resin 5 ($NH_3/Na_2SO_3$), have the desired shelf life.

Moreover, Resin 5 ($NH_3/Na_2SO_3$), which is treated with ammonia to remove the free formaldehyde first and then with a sodium sulfite reducing agent, seems to reduce the resorcinol decay rate.

Wood Strandboard Test

In order to evaluate the curing speed of the resorcinol modified powder resins, they were compared against the control powder (no resorcinol modification) for making 7/16 inch thick strandboard. Three layer (face/core/face) strandboards were made with the experimental powder resin used for the core-layer and the commercial OSB powder face resin, Cascophen W91B (available from Borden Chemical, Inc., Edmonton, Alberta) used for the face-layers. The powder resin add-on rates were 2% phenol-formaldehyde (PF) solids based on dry wood weight for the face-layer and 2% PF solids (control) and 2% PF+resorcinol solids (resorcinol modified powder resins) for the core-layer. The PF solids and PF+resorcinol solids contents of the powder resins were calculated by subtracting out the non-volatile inorganic content, such as sodium hydroxide and sodium sulfite. The strandboard pressing conditions were the same as described in Example 2. The mat moisture contents ranged between 5.1–5.4% for the face and 3.3–3.6% for the core-layer. The effects of press times on internal bond (IB) of the strandboards are shown in Table 11.

TABLE 11

Internal Bond vs. Press Time

| Press time (minutes) | 1.75 | 2.00 | 2.25 | 2.50 | 2.75 |
|---|---|---|---|---|---|
| | | Internal Bonds (psi) | | | |
| Control | Delamination | 28.5 | 53.2 | 56.4 | 57.4 |
| Resin 5 ($Na_2SO_3$) | Delamination | 23.4 | 42.9 | 53.9 | 49.7 |
| Resin 5 ($NH_3$) | 28.0 | 44.5 | 57.6 | 58.1 | 54.2 |
| Resin 5 ($NH_3/Na_2SO_3$) | 36.7 | 60.3 | 53.6 | 59.7 | 53.9 |

The results confirmed that the curing speed of the resorcinol modified powder resins is significantly affected by the free resorcinol content in the powder resin. Resin 5 ($Na_2SO_3$) contained very low free resorcinol (0.15%). Thus the curing speed of that powder resin was not better than the control resin. Whereas Resin 5 ($NH_3$) and Resin 5 ($NH_3/Na_2SO_3$) which contained 2.4% and 2.6% resorcinol content respectively (Table 10) showed much faster cure speeds than Resin 5 ($Na_2SO_3$) and the control resin.

EXAMPLE 6

This example compares in-line versus batch mixing methods of preparing resorcinol modified liquid phenol-formaldehyde resin mix on spray-drying free resorcinol retention. Due to the high reactivity of resorcinol in the liquid resorcinol phenol-formaldehyde resin mix at ambient temperature, the free resorcinol content in the spray-dried powder is affected by the length of time between preparation of the resorcinol modified phenol-formaldehyde resin mix and spray-drying to powder resin. An in-line mixing method can have a consistent and shorter preparation time and thus produce consistent and higher free resorcinol retention in the powder resin.

Preparation of Phenol-Formaldehyde Resin

A 92,900 kg batch of liquid phenol-formaldehyde resin was made according to the formulation and procedure described in Example 1. The resin had a free formaldehyde content of 0.02%. Therefore, an extra 100 kg of aqua ammonia (30%) was added to reduce the residual free formaldehyde to zero. The resin had the following properties:

Non-volatile content: 48.5%

Refractive index (25° C.): 1.4776

Viscosity (Brookfield at 25° C.): 695 cps

Preparation of Diluted Phenol-formaldehyde Resin

After the liquid resin was cooled to 50° C., 155 kg of oleic acid was mixed with the resin and then 30,510 kg of cold water was added. The diluted liquid resin was continuously cooled to 21° C. The properties of the diluted resin were as follows:

Non-volatile content: 36.59%
Refractive index (25° C.): 1.4370
Viscosity (Gardner-Holdt at 25° C.): EE-F
Viscosity (Brookfield at 25° C.): 123 cps
Specific Gravity (25° C.) 1.134

Half of the diluted resin, 61,782 kg, was used for in-line mixing with the resorcinol solution and spray-dried to powder resin. The rest of the resin, 61,783 kg, was mixed with the resorcinol solution for the batch spray-drying test.

Preparation of the Resorcinol Solution

A resorcinol solution was made by dissolving 3060 kg resorcinol in 10,000 kg cold water. The solution had the following properties:

Resorcinol content: 23.43%
Refractive index (25° C.): 1.3816
Specific Gravity (25° C.) 1.052

Spray-drying Phenol-formaldehyde Resin and Resorcinol Solution Using In-line Mixing Two pumping systems were used to deliver the resin and the resorcinol solution to the spray dryer. The pumping rates and the spray-drying rate were adjusted as follows:

Phenol-formaldehyde resin: 33.45 L/minute
Resorcinol solution: 4.35 L/minute
Spray-drying rate: 37.8 L/minute After the resin and resorcinol solution were mixed in the piping system, the mixed solution traveled through 193 feet (58.8 metres) length of the piping system before spray-drying. The volume in the piping system was 204.6 Litres. Therefore, the resorcinol and resin mixing time was approximately 5.4 minutes in the piping system. The powder resin was mixed with 0.3% silicate before bagging. During the spray-drying test, 6 powder resin samples where sample from 6 bags of the powder resin product (1300 kg/bag). The powder resin samples were analyzed for free resorcinol content by HPLC method, free water by Karl Fischer titration, thermal flow (fusion diameter), and non-volatile content. The results are shown in Table 12. By calculation, the spray-dried powder resin theoretically contained 6.5% resorcinol content.

TABLE 12

Powder Resin Properties From In-line Mixing Spray-Drying

| Sample | Fusion Diameter (mm) | Free Resorcinol (%) | Free Resorcinol Retention (%) | Free Water (%) | Non-volatile content (%) |
|---|---|---|---|---|---|
| 1 | 31 | 5.44 | 83.7 | 2.8 | 92.4 |
| 2 | 33 | 5.71 | 87.8 |  | 92.1 |
| 3 | 29 | 5.37 | 82.6 | 2.9 | 91.3 |
| 4 | 30 | 5.52 | 84.9 |  | 92.3 |
| 5 | 28 | 5.08 | 78.2 |  | 92.3 |
| 6 | 33 | 5.75 | 88.5 |  | 91.7 |
| Average | 31 | 5.48 | 84.3 | 2.9 | 92.0 |

The results showed that the in-line mix procedure produced a desired free resorcinol retention rate in the spray-dried resin. Also, the spray-dried resin had the desired properties for OSB maunfacturing.

Spray-drying Phenol-formaldehyde Resin and Resorcinol Solution Using Batch Mixing A batch of resorcinol modified liquid phenol-formaldehyde resin mix was made by mixing 61,783 kg of the diluted phenol-formaldehyde resin (36.51% non-volatile content) and 7060 kg of resorcinol solution (23.43% resorcinol content).

Non-volatile content: 35.17%
Resorcinol content: 2.40%

The temperature of the resin mix was 21° C. The liquid resin mix was spray-dried within 24 hours after the liquid mix was made. Again, 6 powder resin samples were sampled from 6 bags and analized. The results are shown in Table 13. By calculation, the spray-dried powder resin theoretically contained 6.25% resorcinol content.

TABLE 13

Powder Resin Properties From Batch Mixing Spray-Drying

| Sample | Fusion Diameter (mm) | Free Resorcinol (%) | Free Resorcinol Retention (%) | Free Water (%) | Non-volatile content (%) |
|---|---|---|---|---|---|
| 1 | 29 | 3.27 | 52.7 | 3.0 | 92.0 |
| 2 | 31 | 4.23 | 68.2 |  | 91.9 |
| 3 | 32 | 4.04 | 65.2 | 2.8 | 91.9 |
| 4 | 30 | 4.19 | 67.6 |  | 91.4 |
| 5 | 33 | 3.63 | 58.5 |  | 91.3 |
| 6 | 32 | 3.92 | 63.2 |  | 91.5 |
| Average | 32 | 3.88 | 62.6 | 2.9 | 91.6 |

The spray-dried powder resins contain significantly lower free resorcinol content than those produced from the in-line mixing method.

EXAMPLE 7

This example demonstrates synthesizing a liquid phenol-formaldehyde resin and a method for reducing the residual free formaldehyde. The resin is a desired precursor for manufacturing resorcinol modified powder resin composition.

A resin reactor was charged with the following ingredients:

| Ingredient | Parts by Weight | Molar Ratio |
|---|---|---|
| Phenol (100% concentration) | 29.38 | 1 |
| 1st Water | 10.48 |  |
| Sodium Hydroxide (50% concentration) | 6.12 | 0.245 |
| 1st Formaldehyde (50% concentration) | 22.50 | 1.2 |
| 2nd Water | 5.62 |  |
| 3rd Water | 5.69 |  |
| 2nd Formaldehyde (50% concentration) | 18.31 | 0.98 |
| 4th Water | As required |  |
| Aqua Ammonia (30% concentration) | 1.90 |  |
| Total | 100.00 |  |

Phenol, first water and sodium hydroxide were first charged to a reactor. Programmed addition of the first formaldehyde over 30 minutes, added the second water, and allowed the temperature to exotherm to 65° C. and maintained at 65° C. for an additional 20 minutes. Then heated the mixture to 95° C. in 20 minutes and maintained at that temperature until 10 minutes after a Gardner-Holdt viscosity (at 25° C.) between I and J. Added third water, adjusted the temperature to 65° C., then programmed addition of the second formaldehyde over 15 minutes, and added the fourth water. Again maintained the temperature at 65° C. until 10 minutes after a viscosity between I and J. Then rapidly cooled to below 50° C. and added the aqua ammonia under the resin surface.

The free formaldehyde content of the resin was 0.02%. Therefore, 0.08 parts of extra aqua ammonia (30%) was added to scavenge the residual free formaldehyde.

The properties of the resin were as follows:
Non-volatile content: 45.0%
Refractive index (25° C.): 1.4643
Sodium hydroxide content: 3.06%
Viscosity (Gardner-Holdt): J
Number average molecular weight ($M_n$): 1066
Weight average molecular weight ($M_w$): 1220

EXAMPLE 8

This example describes a formulation for a resorcinol modified spray-dried resin and evaluated the powder resin cure speed for strandboard manufacture.

The phenol-formaldehyde resin described in Example 7 was modified with resorcinol as shown in Table 14.

TABLE 14

Modification of Example 7 Resin

|  | Resin 8L (Weight %) | Resin 8AL (Weight %) | Resin 8BL (Weight %) |
|---|---|---|---|
| Resin from Example 7 | 77.03 | 75.80 | 73.50 |
| Oleic acid | 0.18 | 0.18 | 0.18 |
| Water | 22.79 | 22.60 | 24.08 |
| Resorcinol | 0.00 | 1.42 | 2.24 |
| Total | 100.00 | 100.00 | 100.00 |
| Non-volatile content (%) | 34.83 | 35.53 | 35.32 |
| Refractive index (at 25° C.) | 1.4303 | | |
| Viscosity (Gardner-Holdt) | B | | |
| Sodium hydroxide content (%) | 2.36 | 2.32 | 2.25 |

The Resin 8L was made by mixing the liquid resin of Example 7, oleic acid, and water. The resorcinol modified liquid resin mixes, Resin 8AL and Resin 8BL were made by first preparing a resorcinol solution and then blended with oleic acid and phenol-formaldehyde resin.

The liquid resin mixes were spray-dried with a laboratory spray dryer as described in Example 1 within 2 hours after mixing with resorcinol. The 3 powder resins are identified as Resin 8, 8A, and 8B. The properties of the powder resins are shown in Table 15. The free resorcinol content of the powder resin was analyzed using the HPLC method.

TABLE 15

Powder Resin Properties

|  | Resin 8 | Resin 8A | Resin 8B |
|---|---|---|---|
| Molecular weight ($M_n$) | 1112 | | |
| Molecular weight ($M_w$) | 1717 | | |
| Non-volatile content (%) | 92.2 | 92.5 | 92.5 |
| Fusion diameter (mm) | 31.5 | 32 | 32 |
| Sodium Hydroxide content (%) | 6.2 | 6.0 | 5.8 |
| Free Resorcinol content (%) | 0 | 2.6 | 4.0 |
| Resorcinol Retention (%) | N/A | 70.8 | 68.9 |

The powder resins were evaluated for cure speed by making homogeneous laboratory strandboards with mat moisture contents of 6.2% and 7.7%. The target board thickness was 7/16 inch and press times were 1.75, 2.00, 2.25, 2.50, and 2.75 minutes. The board making method and press conditions were the same as described in Example 2.

Aspen wood strand furnish was first sprayed with 1.0% wax solids using wax emulsion, then blended with 2% phenol-formaldehyde (PF) solids for Resin 8 and 2% PF+resorcinol solids for Resins 8A & 8B based on dry wood weight. The solids content of the phenol-formaldehyde and PF+resorcinol were calculated from the powder resin non-volatile content minus the sodium hydroxide content shown in Table 15.

Effect of free resorcinol content in the powder resin and press time on the internal bonds of the strandboards are shown in Table 16.

TABLE 16

Internal Bond vs. Press Time

| Press time (minutes) | 1.75 | 2.00 | 2.25 | 2.50 | 2.75 |
|---|---|---|---|---|---|
|  | | Internal Bonds (psi) | | | |
| Mat moisture: 6.3% | | | | | |
| Resin 8 | Delamination | 6.8 | 61.0 | 78.5 | 92.1 |
| Resin 8A | 14.4 | 65.4 | 72.3 | 77.1 | 67.1 |
| Resin 8B | 26.7 | 69.6 | 67.4 | 76.2 | 76.3 |
| Mat moisture: 7.7% | | | | | |
| Resin 8 | Delamination | Delamination | 45.1 | 42.0 | 50.9 |
| Resin 8A | Delamination | 34.5 | 52.3 | 53.2 | 57.5 |
| Resin 8B | Delamination | 42.3 | 52.8 | 72.6 | 71.5 |

The results showed that the powder resins containing 2.6% (Resin 8A) and 4.0% (Resin 8B) free resorcinol contents showed a faster cure property than the powder resin containing zero resorcinol (Resin 8).

EXAMPLE 9

This example compares the free resorcinol decay rates of a phenol-formaldehyde resorcinol modified liquid resin versus its spray-dried powder resin at room temperature (23° C.) and at 4° C.

Resin 9L uses the phenol-formaldehyde liquid resin as prepared in Example 7. The Resin 9L mix was made as follows:

|  | Weight % |
|---|---|
| Resin from Example 7 | 94.81 |
| Resorcinol | 2.24 |
| Water | 2.95 |
| Total | 100.00 |

Non-volatile content: 44.90%
Refractive index (at 25° C.): 1.4622
Viscosity (Gardner-Holdt): HH-I The liquid resin mix, Resin 9L, was made by mixing 94.81 parts resin from Example 7 with the resorcinol solution prepared by mixing 2.24 parts resorcinol and 2.95 parts cold water. The Resin 9L mix was spray-dried into powder resin (Resin 9) by using a laboratory spray dryer. The powder resin had the following properties:

Non-volatile content: 91.9%
Fusion diameter: 31 mm
Free resorcinol content: 3.58%
Free resorcinol retention: 78.1%

The free resorcinol contents in the liquid and powder resins were determined using the HPLC method.

In order to compare the shelf lives of the liquid and powder resins, Resin 9L and Resin 9 were aged at 23° C. and 4° C. The free resorcinol content was analyzed periodically.

Liquid Resin 9L

TABLE 17

Free Resorcinol Decay Rate for the Liquid Resin

| Days at 23° C. | 0 | 0.1 | 1 | 4 |
|---|---|---|---|---|
| Free Resorcinol Content (%) | 2.24 | 1.99 | 1.37 | 0.66 |
| Free Resorcinol Retention (%) | 100 | 89 | 61 | 29 |
| Days at 4° C. | 0 | 4 | 11 | 15 | 27 |
| Free Resorcinol Content (%) | 2.24 | 2.23 | 1.84 | 1.45 | 1.40 |
| Free Resorcinol Retention (%) | 100 | 100 | 82 | 65 | 63 |

Powder Resin 9

TABLE 18

Free Resorcinol Decay Rate for the Powder Resin

| Days at 23° C. | 0 | 3 | 11 | 17 |
|---|---|---|---|---|
| Free Resorcinol Content (%) | 3.58 | 3.69 | 2.90 | 2.46 |
| Free Resorcinol Retention (%) | 100 | 103 | 81 | 69 |
| Days at 4° C. | 0 | 3 | 11 | 18 |
| Free Resorcinol Content (%) | 3.58 | 3.21 | 2.91 | 3.18 |
| Free Resorcinol Retention (%) | 100 | 90 | 81 | 89 |

The results indicated that the free resorcinol in the spray-dried powder resin is much more stable than in the liquid resin. With the powder resin, the resorcinol is less sensitive to the temperature between 23° C. and 4° C. The data suggested that the resorcinol decay rates at 23° C. in the liquid resin (Resin 9L) was about 10 times higher than the spray-dried powder resin (Resin 9). Furthermore, the resorcinol decay rate of the liquid resin was also significantly affected by storage temperature. At 23° C., the decay rate was over 15 times higher than at 4° C. However, for the powder resin, the resorcinol decay rate was less sensitive to the temperature between 23° C. and 4° C.

EXAMPLE 10

This example illustrates the manufacture of resorcinol modified phenol-formaldehyde powder resin by an in-line mixing method. The in-line mixing method was identical to that described in Example 6. By this method, the resorcinol solution and phenol-formaldehyde resin were mixed in a piping system before the spray-drying atomization process. The mixing time was very short and consistent, so that free resorcinol retained in the powder resin was high and also consistent. The example also showed the results of applying the resorcinol modified powder resin for manufacturing OSB panels in a commercial OSB mill.

A 60,000 kg phenol-formaldehyde liquid resin batch was manufactured according to the formulation and procedure described in Example 7. The resulting liquid resin was analyzed to contain 0.02% free formaldehyde. Therefore, 60 kg of 30% aqua ammonia was added to reduce the free formaldehyde content to zero. The resin had the following properties:

Non-volatile content: 45.44%
Refractive index (25° C.): 1.4652
Viscosity (Gardner-Holdt at 25° C.): GH
Viscosity (Brookfield at 25° C.): 172 cps When the resin was cooled to below 50° C., 144 kg of oleic acid was mixed in and then added 15,595 kg of cold water. The diluted resin was continuously cooled to 25° C.

The dilute liquid phenol-formaldehyde resin and the resorcinol solution had the following properties:

1) Diluted phenol-formaldehyde resin
   Non-volatile content: 36.0%
   Specific gravity (at 25° C.) 1.129
2) Resorcinol solution
   Resorcinol content: 31.0%
   Specific gravity (at 25° C.) 1.065

The in-line mixing system was identical to that described in Example 6. The resin and resorcionol pumping rates, spray-drying rate and in-line mixing time were as follows:

Diluted PF resin pumping rate: 48.78 L/minute
Resorcinol solution pumping rate: 3.80L/minute
Spray-drying rate: 52.58L/minute
In-line mixing time: 3.9 minutes
In-line mixing temperature: 24° C.

The production spray dryer was operated at inlet and outlet temperatures of 155° C. and 82° C. repectively. The non-volatile contents of the spray-dried powder resin were 90–92%. The theoretical resorcinol content in the powder resin as calculated based on the in-line resin/resorcinol mix ratio was 5.72%. Table 19 shows the results of fusion diameter, free resorcinol content, free water, and particle size distribution. The powder sample was sampled from each bag (1300 kg/bag) of the spray-dried product.

TABLE 19

Powder Resin Properties

| | | | | Particle Size Distribution | | |
|---|---|---|---|---|---|---|
| Sample | Fusion Diameter (mm) | Free Resorcinol (%) | Free Water (%) | >75 micron (%) | <75 and >45 (%) | <45 micron (%) |
| 1 | 35 | 5.73 | 2.97 | 4.9 | 30.6 | 64.5 |
| 2 | 32 | 5.53 | | 4.4 | 27.1 | 68.5 |
| 3 | 32 | 5.71 | | 4.2 | 31.6 | 64.2 |
| 4 | 34 | 5.70 | 2.75 | 4.6 | 27.9 | 67.5 |
| 5 | 30 | | | 4.5 | 27.4 | 68.1 |
| 6 | 30 | 5.89 | 2.77 | 4.8 | 30.9 | 64.3 |
| 7 | 30 | | | 4.5 | 31.1 | 64.4 |
| 8 | 31 | 5.41 | 2.70 | 4.8 | 35.4 | 59.8 |
| 9 | 30 | | | 4.2 | 29.6 | 66.2 |
| 10 | 34 | 6.11 | | 4.1 | 28.4 | 67.5 |
| Average | 31.8 | 5.72 | 2.80 | 4.5 | 30.0 | 65.5 |

The results in Table 19 showed that the in-line mix method produced consistent and high free resorcinol content in the powder resin. The powder resin also had the desired properties for manufacturing.

Shelf Life of Spray-dried Powder Resin

The spray-dried powder resin was further evaluated for shelf life by aging 3 samples of the powder resin at room temperature (23° C.). The samples contained an average of 5.5% free resorcinol content. The free resorcinol contents were analyzed using the HPLC method. The average results were as follows:

TABLE 20

| | Free Resorcinol Decay Rate | | | | | | | |
|---|---|---|---|---|---|---|---|---|
| Days at 23° C. | 0 | 9 | 23 | 37 | 47 | 51 | 58 | 65 | 72 |
| Free Resorcinol Content (%) | 5.50 | 5.06 | 4.64 | 3.94 | 3.68 | 3.06 | 2.69 | 2.38 | 2.15 |
| Free Resorcinol Retention (%) | 100 | 92 | 84 | 72 | 67 | 56 | 49 | 43 | 39 |

OSB Mill Trial of Spray-dried Powder Resin

Twenty bags (approximately 26,000 kg) of the spray-dried powder resin were tested for use as an OSB core-layer resin in an OSB mill for manufacturing 7/16, 3/8, and 15/32 inch thick OSB. The face powder resin was Cascophen W91B and the control core powder resin was Cascophen W800B, (both available from Borden Chemical, Inc., Edmonton, Alberta), which contains no resorcinol.

For the mill trial, the OSB panels were pressed at normal conditions, but the press times were gradually reduced and the internal bonds of the panels were tested immediately after hot pressing. The results from the lowest press times for each thickness were as follows:

| Board Thickness (inches) | 7/16 | 3/8 | 15/32 |
|---|---|---|---|
| Lowest press times for Control resin (seconds) | 175 | 165 | 190 |
| Lowest press times for Resorcinol modified resin (seconds) | 139 | 125 | 150 |
| Press time reduction Between the 2 resins (%) | 20.6 | 24.2 | 21.1 |
| Average Internal Bond (psi) | >50 | 50 | >35 |

The mill trial results confirmed that the resorcinol modified spray-dried powder resin is 20% faster curing than the control resin that did not contain any resorcinol.

There has been provided in accordance with the present invention, an improved spray-dried resin composition for use in the manufacture of strand board and other products. There has also been provided in accordance with the present invention, a method for improving the cure speed of a powder resin using such an improved composition. There is further provided in accordance with the present invention, a method of making such an improved composition. While the invention has been described with specific embodiments and many alternatives, modifications and variations will be apparent to those skilled in the art in light of the foregoing description. Accordingly, it is intended to include all such alternatives, modifications and variations set forth within the spirit and scope of the appended claims.

What is claimed is:

1. A method for making a fast cure powder resin, the method comprising:
   preparing a liquid phenol-formaldehyde resin;
   reducing the residual formaldehyde in the liquid phenol-formaldehyde resin;
   mixing a curing accelerator with the liquid phenol-formaldehyde resin after the residual formaldehyde is reduced; and
   spray-drying the mixture to form a powder resin.

2. The method of claim 1 wherein the liquid phenol-formaldehyde resin is a resole.

3. The method of claim 2 wherein the resole has a phenol:formaldehyde mole ratio of 1:1.5 to 2.5.

4. The method of claim 1 wherein the residual formaldehyde is reduced using a formaldehyde scavenger.

5. The method of claim 4 wherein the formaldehyde scavenger is selected from the group consisting of ammonia, aqueous ammonia and aqueous ammonium hydroxide.

6. The method of claim 1 wherein the residual formaldehyde is reduced to an amount that is non-detectable using the hydroxylamine-hydrochloride method.

7. The method of claim 1 wherein the curing accelerator is selected from the group consisting of dihydroxy phenols, trihydroxy phenols, meta-amino phenols and meta-alkyl phenols.

8. The method of claim 7 wherein the curing accelerator is resorcinol.

9. The method of claim 1 wherein the liquid phenol-formaldehyde resin is made by a two-stage reaction method comprising the steps of:
   mixing and reacting phenol and formaldehyde at a temperature ranging from about 90° C. to reflux to form a first stage product;
   mixing formaldehyde with the first stage product; and
   reacting the mixture of formaldehyde and first stage product at a temperature of from about 60° C. to about 70° C.

10. The method of claim 9 wherein the curing accelerator is an aqueous resorcinol solution.

11. The method of claim 10 wherein the wherein the liquid phenol-formaldehyde resin is cooled to a temperature in a range from about 20° C. to about 50° C.

12. The method of claim 11 wherein the cooled liquid phenol-formaldehyde resin is mixed with oleic acid and water to form a resin solution.

13. The method of claim 12 wherein the mixing step is performed for about 0.25 minutes to about 3 minutes.

14. The method of claim 1 wherein the mixing step is performed for about 0.25 minutes to about 3 minutes.

15. The method of claim 13 wherein the mixing step is performed utilizing an in-line pumping rate for the resin solution of from about 30 L/minute to about 50 L/minute.

16. The method of claim 13 wherein the mixing step is performed utilizing an in-line pumping rate for the resorcinol solution of from about 3 L/minute to about 5 L/minute.

17. The method of claim 1 wherein the spray-drying step is performed utilizing a spray-drying rate of from about 30 L/minute to about 50 L/minute.

18. The method of claim 1 wherein the mixing step and the spray-drying step are performed for about 0.25 minutes to about 3 minutes.

19. A powder resin made by the method of claim 1.

20. The powder resin of claim 19 wherein the powder resin is free-flowing.

21. The powder resin of claim 19 wherein the powder resin has a particle size distribution wherein 80–90% of the powder resin has a particle size of less than 75 microns and 60–70% of the powder resin has a particle size of less than 45 microns.

22. Oriented strand board (OSB) made by using the powder resin of claim 19.

23. Waferboard made by using the powder resin of claim 19.

24. Fast cure felt made by using the powder resin of claim 19.

25. A woven fibrous compound made by using the powder resin of claim 19.

26. A shell molding compound made by using the powder resin of claim 19.

27. An adhesive composition made by using the powder resin of claim 19.

* * * * *